Oct. 28, 1952 G. O. GRIDLEY 2,615,721
COLLET

Filed May 2, 1947 3 Sheets-Sheet 1

INVENTOR.
GEORGE O. GRIDLEY
BY
*Mitchell Berkut*
ATTORNEYS.

Oct. 28, 1952     G. O. GRIDLEY     2,615,721
COLLET

Filed May 2, 1947     3 Sheets-Sheet 2

INVENTOR.
GEORGE O. GRIDLEY
BY
ATTORNEYS.

Oct. 28, 1952 G. O. GRIDLEY 2,615,721
COLLET

Filed May 2, 1947 3 Sheets—Sheet 3

INVENTOR.
GEORGE O. GRIDLEY
BY
ATTORNEYS.

Patented Oct. 28, 1952

2,615,721

UNITED STATES PATENT OFFICE 2,615,721

COLLET

George O. Gridley, Berlin, Conn., assignor to The New Britain Machine Company, New Britain, Conn., a corporation of Connecticut Application May 2, 1947, Serial No. 745,583

19 Claims. (Cl. 279—60)

1

My invention relates to an improved collet or like device.

Conventionally, the seat-engaging surface of a collet jaw is generally conical and designed to fit the conical collet seat for work of a particular diameter. Unless the work happens to be of the particular designed diameter, there is not a uniform mating between the two conical surfaces and as a result the collet seat may become peened, excessive forces are required to operate the collet, and collet life is much shorter than would be desired.

It is, accordingly, an object of my invention to provide an improved collet or like device.

It is another object to provide an improved collet device which will inherently permit a rather wide and uniform distribution of relatively low clamping pressures over collet seat-engaging surfaces, for a number of work diameters.

It is also an object to provide a collet device of the character indicated requiring substantially reduced forces to operate and having inherently longer life than present similar devices.

It is a further object to provide an improved collet adaptable to existing collet-seat and collet-actuating structures.

Other objects and various further features of the invention will be pointed out or will become apparent to those skilled in the art from a reading of the following specification in conjunction with the accompanying drawings. In said drawings.

Figure 1:
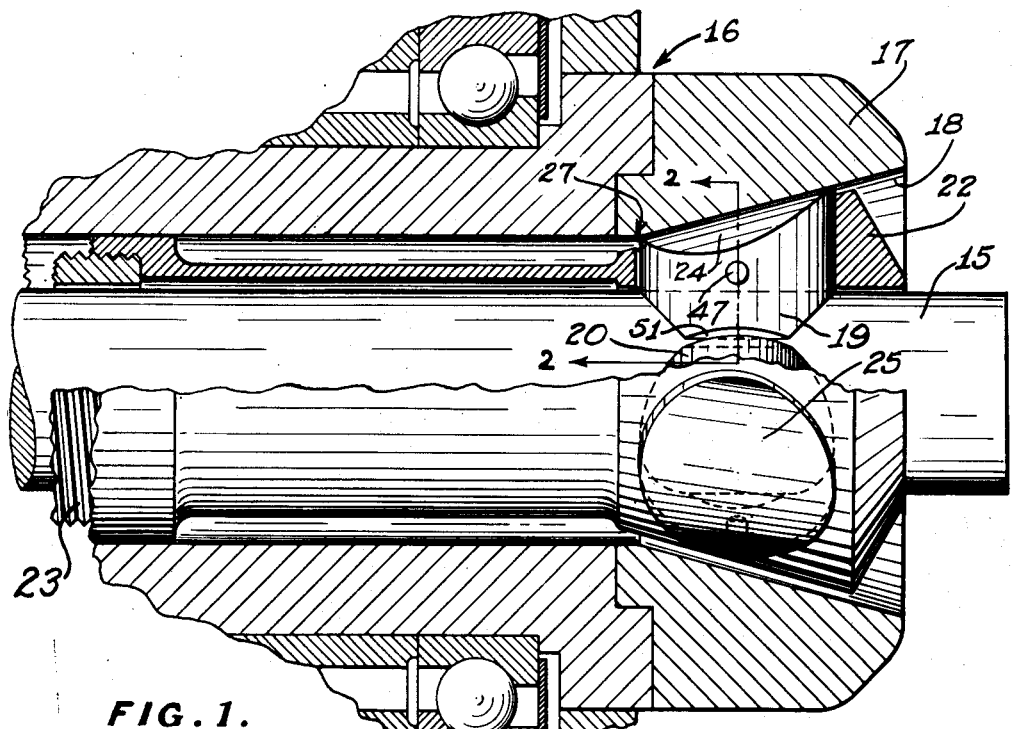
Fig. 1 is a partly broken-away vertical sectional view showing an improved collet construction according to the invention.
Figure 5:
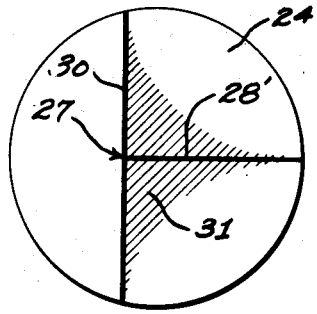
Figure 6:
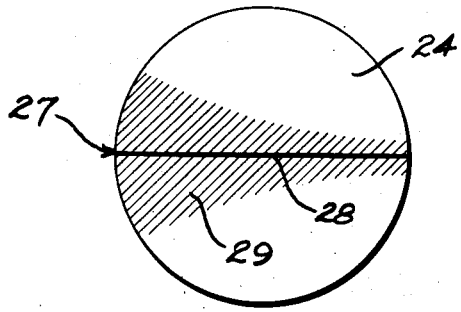
Figure 7:
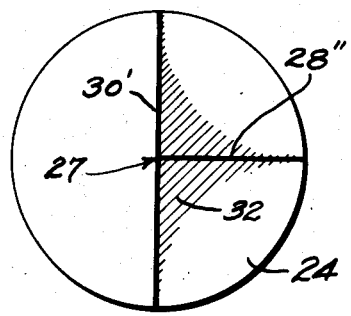
Figure 8:
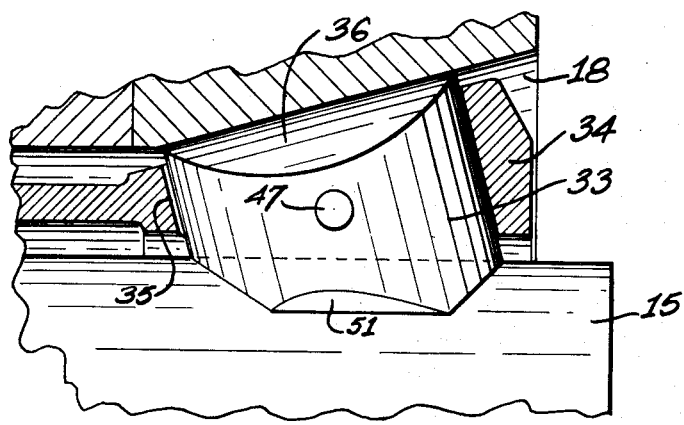
Figure 10:
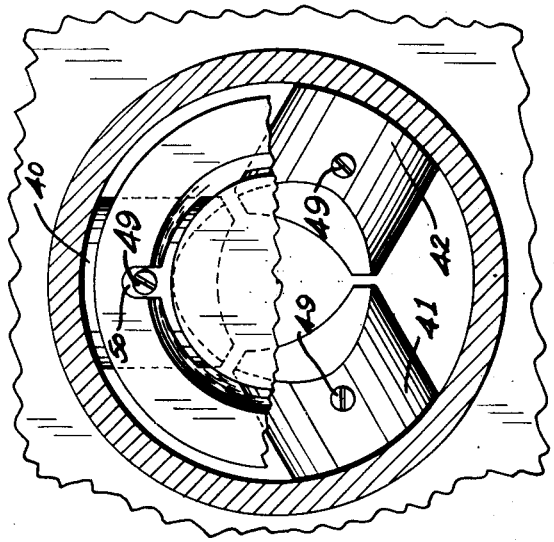
Figure 9:
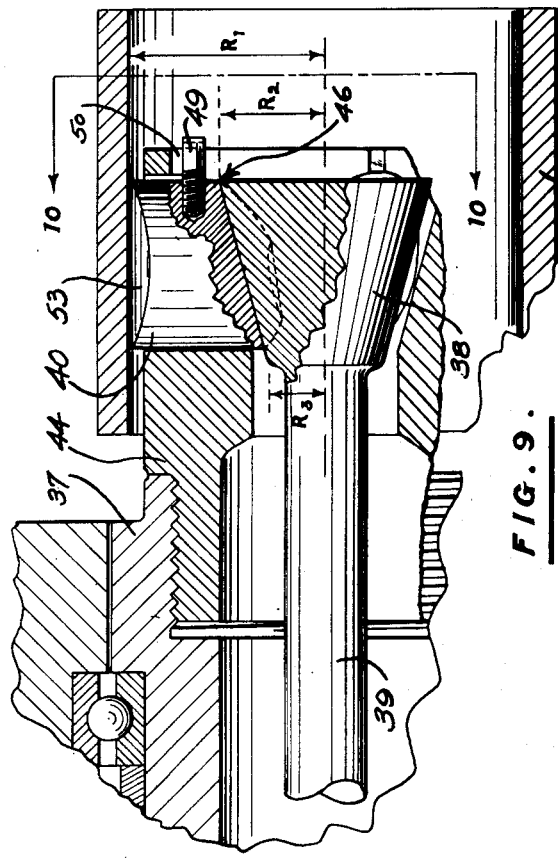

Figs. 5, 6, and 7 are schematic representations of the device of Fig. 1 showing various functions according to the invention;

Fig. 8 is an enlarged fragmentary sectional view generally similar to Fig. 1 but showing an alternative construction according to the invention;

Fig. 9 is a partly broken-away vertical sectional view showing still another alternative construction according to the invention;

Fig. 10 is a sectional view taken substantially in the plane 10—10 of Fig. 9; and

2

Figure 11:
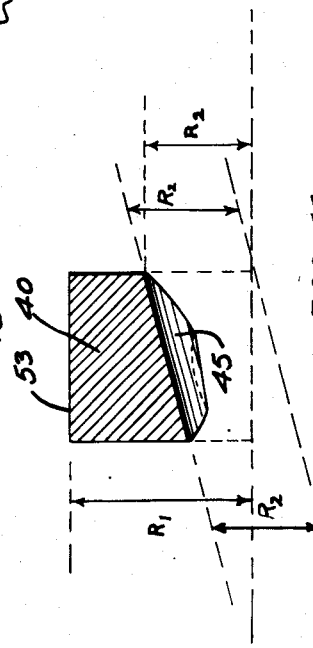

Fig. 11 is a vertical sectional view of a part of the construction of Fig. 9.

Briefly stated, my invention contemplates an improvement of the seating fit of a collet jaw upon a seat. The jaw is formed with a generally cylindrical seating surface and the seat is generally frusto-conical. In the preferred form, the radius of the cylindrical surface substantially equals or coincides with an end radius of the frusto-conical seat. In one specific form, in which the jaw is held radially inwardly of a concave frusto-conical seat, the radius of the cylinder is preferably equal to or coincides with the minimum radius of the seat, and in another specific form, in which the jaw is supported radially outwardly of a conical seat, the radius of the cylindrical surface preferably substantially equals or coincides with the maximum radius of the seat.

Figure 2:
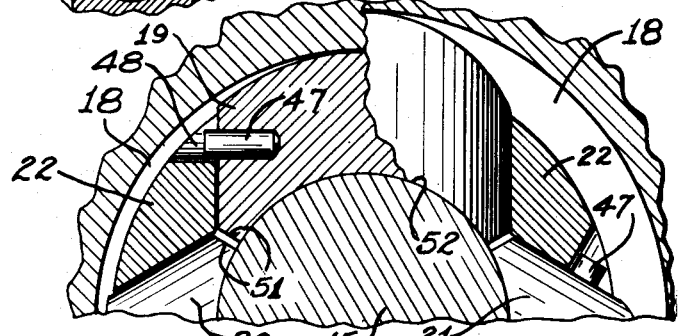
Fig. 2 is an enlarged fragmentary sectional view taken substantially in the plane 2—2 of Fig. 1.

Referring now to Figs. 1 and 2 of the drawings, my invention is shown in application to a spindle machine supporting a piece 15 of bar stock within a rotating spindle 16. The spindle 16 may include a conventional nose 17 having an inner surface 18 which serves as a collet seat. The surface 18 may be generally frusto-conical. A plurality of jaws 19, 20, 21 are angularly spaced about the spindle axis, and disposed between the collet seat 18 and the work 15 to support the latter. The jaws 19—20—21 may be longitudinally supported and actuated by means of a collet holder 22, embracing the jaws while permitting free radial displacement of the jaws. The collet holder 22 may in turn be supported by a conventional collet tube 23 for longitudinal actuation by a so-called drawback mechanism. The parts which have thus far been described are well known and, therefore, form no part of my invention.

In accordance with the invention, the collet-seat-engaging surfaces 24—25—26 of the jaws 19—20—21 are each cylindrically formed and preferably with a radius substantially equal to or coincident with the minimum radius of the frusto-conical seat 18. The axis of each of these cylindrical surfaces is preferably inclined and parallel to the flare of the conical seat 18 which the jaws 19—20—21 are to engage. In the form shown, the jaws 19—20—21 are themselves formed of cylindrical stock and so oriented that their axes extend directly radially of the spindle axis. It follows that their sliding action is generally radial.

It will be appreciated that by virtue of the described arrangement of cylindrical surfaces 24—25—26 with respect to the conical surface 18, it is possible for a relatively wide range of stock diameters to be accommodated by the same jaws, with substantial effectiveness. For example, for the relationship of parts shown in Fig. 1, wherein the rear edge of the jaw surface 24 is drawn against the rear edge or lip 27 of the conical collet seat 18, the radii of the two surfaces 24—18 coincide at this rear point (27) so that an intimate arcuate contact is possible. For all other longitudinal points of contact between the jaw 19 and the collet seat 18, the relationship is theoretically one of tangency between surfaces 24 and 18, and this tangency is along a central line longitudinally and diametrically across the seating surface 24 of the jaw.

Referring to Fig. 6, this theoretical line of contact is schematically indicated by the heavy line 28. As a practical matter, however, due to the inherent slight compressibility of the materials of the collet 17 and of the jaw 19, the clamping contact between these members will be laterally spread so that clamping forces may be distributed somewhat as indicated generally by the shaded area 29. The shaded area 29 will be understood to expand laterally for rearward locations until at the rearmost location 27 the contact is theoretically arcuate, as indicated above. It will thus be seen that for the relationship of parts shown in Figs. 1 and 2, and schematically illustrated in Fig. 6, clamping pressures may be distributed over a relatively wide area 29 and that this area will be symmetrical about the central theoretical line of support 28. As a result, the nature of the fit between the jaw 19 and the collet seat 18 inherently provides stabilizing support against possible cocking of the jaw 19 away from a truly radial orientation with respect to the spindle axis.

Figure 3:
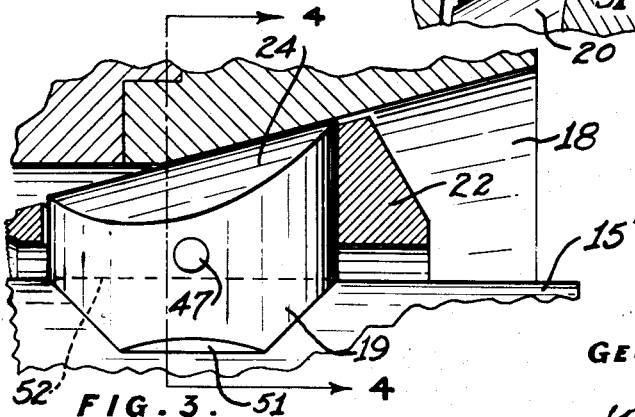
Fig. 3 is an enlarged fragmentary sectional view showing certain of the parts of Fig. 1 in another operating relationship.
Figure 4:
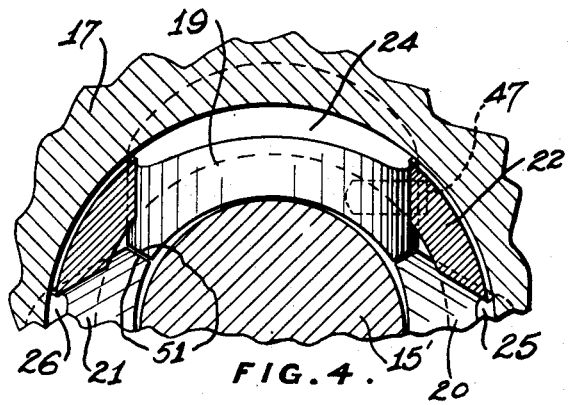
Fig. 4 is an enlarged fragmentary view taken substantially in the plane 4—4 of Fig. 3.

Consider next the relationship of parts shown in Figs. 3 and 4, wherein the collet of Fig. 1 is set to clamp bar stock of smaller diameter than that accommodated in Fig. 1. Since the stock 15' is of lesser diameter, it will be supported by the collet jaws 24—25—26 when these jaws are retracted rearwardly of the position shown in Fig. 1. This case is characterized by an unsupported projection of the jaw surface 24 beyond the rearward lip of the collet seat 18.

The nature of contact between surfaces 24 and 18 under the drawn-back condition of Figs. 3 and 4 is schematically illustrated in Fig. 5. Again, since the radii of the jaw surface 24 and of the collet seat 18 coincide at the rearward position 27, the nature of the contact at that position must be arcuate, as indicated by the transversely extending heavy line 30. Also, for positions forward of location 27, the contact between surfaces 24 and 18 is theoretically tangential along the central longitudinal line indicated as 28'. By virtue of the compressibility of the materials, support is actually distributed over an extended area 31, symmetrical about the line 28' and expanding laterally to the full arcuate contact along line 30. It will be appreciated then that for the relation of parts shown in Figs. 3 and 4, well distributed supporting forces are inherently possible even though the stock diameter is materially less.

Still another relationship of parts is schematically shown in Fig. 7, wherein the jaw 19 projects half way beyond the rear-lip position 27 so that only half of the upper or seating surface 24 is available for support. Again, however, by coincidence of radii, arcuate contact is achieved across the line 30' (in this case, a full diameter across the jaw 19), and there is a theoretical line of contact 28'' for the tangential contacts forward of position 27. Actually, again, compressibility provides a greater area 32 of support, and it will be appreciated that even though only half of the jaw seat is available for support, the supporting area is extensive and so symmetrically distributed as inherently to maintain the jaw 19 erect in its proper radial orientation. It will further be appreciated that this property of maintaining the jaw 19 radially erect exists for all possible seating (relative longitudinal) positions of the jaw 19 and its seat 18.

In some applications it may be preferred that the sliding action of the jaws of my collet be generally normal of the collet seat and hence inclined to the spindle axis, or, alternatively, other intermediate relationships may be desired. In Fig. 8 I show an application of the principles of my invention to a collet in which the jaw action is generally normal to the collet seat at the point of seating contact. Again, the collet seat may be conventional (i. e. frusto-conical), and the collet 33 may be formed of cylindrical stock; the axis of the jaw 33 is, however, inclined generally normal to the surface 18 of the collet seat. A collet holder 34 generally similar to the holder 22 of Fig. 1 may be provided with inclined jaw-retaining bores or guides 35 to retain the jaw axes in the desired normal relationship. In accordance with the invention, the seating surface 36 of the jaw 33 is cylindrically formed with a radius preferably the same as the minimum radius of the cone of the collet seat 18. It will be understood that the above discussion of various relative positions of the jaws and collet seat of Fig. 1 applies equally well for the arrangement of Fig. 8 as do the schematic showings of Figs. 5, 6, and 7, and that, therefore, the Fig. 8 arrangement may provide an effective collet for a number of stock diameters.

In Figs. 9, 10, and 11, I show an application of the principles of my invention to a so-called expanding collet or chuck. The chuck may be revolubly supported in a spindle 37 and incorporate a central generally frusto-conical collet seat 38 which may be actuated by a drawback mechanism (not shown) attached to a rearwardly projecting portion 39 thereof. The collet of Fig. 9 includes expanding jaws 40—41—42 which may be of cylindrical stock and which ride on the collet seat 38 to expand for the internal support of tubular stock 43. In the form shown, a holder 44 for the jaws 40—41—42 is threadedly supported by the spindle 37, and collet actuation is by means of the longitudinal displacement of the collet seat 38.

In accordance with the invention, the seat-engaging surface 45 of the jaw 40 may be generally cylindrical with its radius preferably coinciding with that at an end of the frusto-conical seat—in this case, the forward end, which has the largest radius $R_2$ of the seat 38. It will be appreciated that, for the relationship of parts shown, the radii of the seating surfaces 45—38 coincide at the forward lip position 46 and that, therefore, the contact at this point is theoretically arcuate (about the spindle axis). For rearward positions, the contact is theoretically a longitudinally extending line (similar to the line 28 in Fig. 6) representing tangential contact between surfaces 38—45. However, because of the compressibility of the materials, actual support is much more extensive, expanding laterally as the forward arcuate contact is approached.

It will be appreciated that for other stock internal diameters larger than that of the stock 43 the collet seat 38 will necessarily assume a clamping position rearward of that shown, and that, therefore, parts of the jaws 40—41—42 may be unsupported by the collet seat 38. The mere fact, however, that these surfaces may only be partially supported need cause no concern, and it will be understood that for any seating position there will always be substantial lateral support and substantial longitudinal support over an extended area.

In accordance with a feature of the invention the jaws for an internally contracting collet or for an externally expanding collet may be properly retained against dislocation in the temporary absence of a piece of stock. For example, in the arrangements of Figs. 1 and 8, transversely extending pins 47 are set in the jaws and project to be received in slots 48, which may be milled in the adjacent supporting side of the collet holder 22 or 34. In the case of Fig. 9, pins 49 guard against radially outward dislodgment of jaws 40—41—42. The pins 49 are shown in the form of screws longitudinally threaded in the front ends of jaws 40—41—42. The screws 49 are slidably received in slots 50, which may be milled or otherwise formed in the collet holder 44.

It will be appreciated that the greater the cross-sectional area of the jaws of my improved collets, the more effectively distributed will be the clamping forces over the various seating areas. In the forms shown in Figs. 1 and 8, the jaws are of cylindrical stock of a diameter approximating that of the stock to be accommodated thereby. In such case, to allow for the necessary radial freedom, flats 51 may be milled in planes extending generally radially of the spindle axis. As will be seen in Fig. 4, a proper milling of the flats 51 may assure a nonfouling grip of the jaws on the stock 15' even though the stock diameter is substantially reduced.

For more effective contact of the work-gripping surfaces of my collet jaws with the work, I prefer that they be cylindrically formed with a radius substantially equal to an extreme radius of work to be accommodated thereby. For example, in the case of the contracting-type collet, let it be assumed that the Fig. 1 relationship of parts represents the maximum size of stock 15 to be accommodated by the collet. In such case, the work-gripping surface 52 of the jaw 19 may be of the radius of stock 15 so that for the assumed extreme position, full-area contact between jaw 19 and the work 15 is permitted (see Fig. 2). In such event, it will be understood that, even for the case of stock 15' of substantially less diameter, the work-gripping action, although theoretically only a central longitudinally extending line of successive tangential contacts, may be well distributed either side of this line so that no peening or other undesired effects need occur on the work or on the jaws.

In the case of the expanding collet of Fig. 9, the work-gripping surface 53 is preferably cylindrical and of a radius $R_1$ equal to the minimum internal diameter of stock 43 to be accommodated. Let it be assumed that the relationship of parts shown in Fig. 9 represents the extreme case of supporting stock 43 of minimum internal diameter. For all other sizes of stock held by the jaws 40—41—42, it will be appreciated that the same type of well-distributed work-gripping contact may be realized as that described for the Fig. 1 arrangement.

Throughout the above description the preferred seat-engaging surfaces of my collet or chuck jaws have been described as being cylindrical about an axis inclined in accordance with the slope of the frusto-conical seat to be engaged. For many applications a pure circularly cylindrical surface generated about this inclined axis may be entirely satisfactory. However, for best seating engagement in accordance with the invention, I prefer that the seat-engaging surfaces be what might be termed slightly elliptically cylindrical. The nature of this latter surface is such that, for any section normal to the axis of the frusto-conical seat, the seat-engaging jaw surface is a circular arc, sections normal to the axis of the seat-engaging surface being generally elliptical. Stated in other words, the radius of what I term the cylindrical seat-engaging jaw surface is constant and is described about axes parallel to the axis of the frusto-conical seat; and what I term the inclined axis of this cylindrical surface is the locus of the center for any radius described as above. Figs. 9 and 11 clearly illustrate the preferred relation of $R_2$, the maximum radius of the conical collet seat 38 and the radius of the cylindrical seat-engaging surface 45.

It will be appreciated that I have described relatively simple collet structures in which extremely effective work-gripping relationships obtain for a relatively wide range of stock sizes—whether the stock is to be gripped internally or externally. In practice, I have found that my improved collets require very substantially reduced longitudinal actuating forces (as by drawback mechanisms), and that by virtue of the extended areas of support inherent with structures according to the invention, there is no peening or other harmful wear of the collet seats or of the jaws.

It will be realized that the principles of my invention are readily adaptable to machines having conventional collet seats and collet-actuating mechanisms and that, by replaceably inserting jaws of different sizes, even greater ranges of stock diameter may be accommodated by the same collet holder and by the same collet seat.

While I have described my invention in detail for the preferred forms shown, it will be understood that modifications may be made within the scope of the invention as defined in the appended claims.

I claim:

1. In a device of the character indicated, a seat member having a generally frusto-conical seating surface, and a jaw member having a generally cylindrical surface to seat on said frusto-conical surface, one of said surfaces being located radially inside the other with respect to the axis of said conical seating surface, the radius of said cylindrical surface as described in planes perpendicular to the axis of said frusto-conical surface being substantially the same as the radius at one end of said frusto-conical surface, said first-mentioned radius being taken from an axis inclined in accordance with the slope of said frusto-conical surface, the maximum effective radius of the inner of said surfaces being no greater than substantially the minimum effective radius of the outer of said surfaces.

2. In a device of the character indicated, a seat member having a generally frusto-conical seating surface, and a jaw member having a generally cylindrical surface to seat on said frusto-conical surface, the radius of said cylindrical surface being substantially the same as the radius at one end of said frusto-conical surface, said surfaces at the other end of said frusto-conical surface being of such radii as to permit substantially only tangential contact between said surfaces.

3. In a device of the character indicated, a seat member having a concave frusto-conical surface, a jaw member having a convex cylindrical surface to seat on said seat member, the radius of said cylindrical surface being no greater than substantially the minimum effective radius of said conical surface, means supporting said jaw member for movement generally radially of the axis of said conical surface, and means for actuating said members longitudinally relatively to each other.

4. In a device of the character indicated, a seat member having a convex frusto-conical seating surface, a jaw member having a concave cylindrical surface to seat on said frusto-conical seating surface, the radius of said cylindrical surface being at least as great as substantially the maximum effective radius of said conical surface, means supporting said jaw member for movement generally radially of the axis of said conical surface, and means for actuating said members longitudinally relatively to each other.

5. In a clamping device of the character indicated, a generally conical seat means, a plurality of jaw means having cylindrical seating surfaces of finite radius to engage said seat means, means for holding said jaws in angularly spaced relation about the axis of said seat, whereby one of said jaw and seat means may be radially within the other, the maximum effective radius of the inner of said jaw and seat means being no greater than substantially the minimum effective radius of the outer of said jaw and seat means, and displacement means for longitudinally displacing said jaws and seat with respect to each other.

6. In a collet, a concave conical seat, a plurality of angularly spaced cylindrical jaws having outer cylindrical surfaces to engage said seat and inner work-engaging surfaces and a collet holder for retaining and longitudinally actuating said jaws relatively to said seat, the radii of said cylindrical surfaces being no greater than substantially the minimum effective radius of said seat.

7. In a device of the character indicated, a convex conical seat, a plurality of cylindrical jaws angularly spaced about said seat and having inner concave cylindrical surfaces to engage said seat and outer work-engaging surfaces, a holder for longitudinally holding said jaws, and actuating means for longitudinally displacing said seat and said holder relatively to each other, the radii of said cylindrical surfaces being no less than substantially the maximum effective radius of said seat.

8. In a device of the character indicated, a frusto-conical seat, a plurality of cylindrical jaws with their axes radially directed and angularly spaced with respect to the axis of said seat, said jaws having cylindrical seat-engaging surfaces of a radius substantially equal to the minimum effective radius of said seat, a holder for said jaws, and actuating means for longitudinally displacing said holder and said seat with respect to one another.

9. In a device of the character indicated, frusto-conical seat means, a plurality of cylindrical jaw means with their axes substantially normal to the surface of said seat means, said jaw means having cylindrical seat-engaging surfaces, one of said jaw and seat means being convex and the other concave, the maximum concave radius being no greater than substantially the minimum effective convex radius, and angularly spaced with respect to said seat, a holder for said jaw means, and actuating means for longitudinally positioning said holder and said seat means with respect to each other.

10. A device according to claim 5, in which retaining means between said jaw means and said holding means retain said jaw means from displacement beyond a limiting radial displacement of said jaw means and said holding means relatively to each other.

11. As an article of manufacture, a jaw for a clamping device of the character indicated, said jaw being generally cylindrical with a seat-engaging surface at one end and a longitudinal work-engaging surface at the other end, said seat-engaging surface being cylindrical about an axis inclined to said longitudinal work-engaging surface.

12. As an article of manufacture, a jaw for a device of the character indicated, said jaw being generally cylindrical and having a work-engaging surface at one end and a seat-engaging surface at the other end, said seat-engaging surface being convex and cylindrical about an axis inclined to the axis of said jaw.

13. As an article of manufacture, a jaw for a device of the character indicated, said jaw being generally cylindrical and having a work-engaging surface at one end and a seat-engaging surface at the other end, said seat-engaging surface being convex and cylindrical about an axis perpendicular to the axis of said jaw.

14. As an article of manufacture, a jaw for a device of the character indicated, said jaw being generally cylindrical and having a work-engaging surface at one end and a seat-engaging surface at the other end, said seat-engaging surface being concave and cylindrical about an axis inclined to the axis of said jaw.

15. In a device of the character indicated, a plurality of generally radially movable jaws having convex cylindrical outer surfaces for engagement with a conical collet seat, a projecting pin on each said jaw, and projecting generally transversely of generally radial jaw movement, and a collet holder for supporting said jaws and for actuating the same, said holder having pin-receiving recesses to hold said jaws against radially inward dislodgment from said holder, said cylindrical outer surfaces being inclined with respect to the axis of said holder.

16. In a device of the character indicated, a convex frusto-conical seat, a jaw having a cylindrical surface to engage said seat, a holder for said jaw, said holder embracing said jaw and having a radially inwardly opening slot, a projection on said jaw and generally transverse to the displacement axis of said jaw, said projection being receivable in said slot, whereby said jaw may be retained against radially outward dislodgement from said holder.

17. As an article of manufacture, a jaw for a device of the character indicated, said jaw being generally cylindrical and having work-engaging means at one end and a seat-engaging surface at the other end, said seat-engaging surface being cylindrical to seat on a frusto-conical seat surface, one of said surfaces being convex and the other concave, the radius of said cylindrical seat-engaging surface being described in planes perpendicular to the axis of the frusto-conical seat surface and being taken from an axis inclined in accordance with the slope of the seat surface upon which it is to be seated.

18. In a device of the character indicated, a jaw-seating surface, and a jaw having a seating surface inclined in accordance with the slope of said jaw-seating surface, the nature of said surfaces being such that for a plurality of relative longitudinal positions of said surfaces there may be substantially full arcuate contact between said seating surfaces along the arc of greatest radius of said jaw-seating surface.

19. In a device of the character indicated, a jaw member including a cylindrical seat-engaging surface, a seat member including a conical seat surface for the seat-engaging surface of said jaw member, means supporting said jaw member for movement generally radially of said seat member upon a relative longitudinal coacting displacement of said members, one of said surfaces being convex and the other concave, the concave surface being radially outside and the convex surface being radially inside with respect to the axis of said conical seat surface, the maximum effective radius of the inner of said surfaces being no greater than substantially the minimum effective radius of the outer of said surfaces.

GEORGE O. GRIDLEY.

REFERENCES CITED

The following references are of record in the file of this patent:

UNITED STATES PATENTS

| Number | Name | Date |
|---|---|---|
| 1,132,550 | Bodmer | Mar. 23, 1915 |
| 1,374,560 | Ganster | Apr. 12, 1921 |
| 1,499,727 | Hanson | July 1, 1924 |
| 1,867,266 | Johnson et al. | July 12, 1932 |
| 2,386,469 | Iversen | Oct. 9, 1945 |

FOREIGN PATENTS

| Number | Country | Date |
|---|---|---|
| 494,288 | France | 1919 |